(12) United States Patent
Lee

(10) Patent No.: US 10,556,689 B2
(45) Date of Patent: Feb. 11, 2020

(54) CONVERTIBLE SEATING UNIT

(71) Applicant: James Shing Hin Lee, Kowloon (HK)

(72) Inventor: James Shing Hin Lee, Kowloon (HK)

(73) Assignee: BUTTERFLY FLEXIBLE SEATING SOLUTIONS LIMITED, Hong Kong (HK)

( * ) Notice: Subject to any disclaimer, the term of this patent is extended or adjusted under 35 U.S.C. 154(b) by 484 days.

(21) Appl. No.: 15/038,091

(22) PCT Filed: Dec. 3, 2013

(86) PCT No.: PCT/CN2013/088432
§ 371 (c)(1),
(2) Date: May 20, 2016

(87) PCT Pub. No.: WO2015/081496
PCT Pub. Date: Jun. 11, 2015

(65) Prior Publication Data
US 2016/0297534 A1 Oct. 13, 2016

(51) Int. Cl.
*B64D 11/00* (2006.01)
*B64D 11/06* (2006.01)

(52) U.S. Cl.
CPC ...... *B64D 11/0641* (2014.12); *B64D 11/0601* (2014.12); *B64D 11/0606* (2014.12); *B64D 11/0643* (2014.12)

(58) Field of Classification Search
CPC ............ B64D 11/0641; B64D 11/0642; B64D 11/0601; B64D 11/06; B61D 33/0021; B60N 2002/0204; B60N 2/22; B60N 2/20; B60N 2/34; B60N 2/36
See application file for complete search history.

(56) References Cited

U.S. PATENT DOCUMENTS 5,259,575 A * 11/1993 Cabrera ................... B61D 1/02
105/316
6,059,364 A 5/2000 Dryburgh et al.
D443,990 S * 6/2001 Beroth ................... B64D 11/00
D6/356

(Continued)

FOREIGN PATENT DOCUMENTS

GB 2500258 A 9/2013
WO 9618537 A1 6/1996

(Continued)

OTHER PUBLICATIONS

International Search Report (ISR) dated Jul. 25, 2014 citing six documents with categories indicated, International Application No. PCT/CN2013/088432, 4 pages.

*Primary Examiner* — Jessica B Wong
(74) *Attorney, Agent, or Firm* — Ware, Fressola, Maguire & Barber LLP

(57) ABSTRACT

A convertible seating unit (100, 200) is disclosed as including a first seat (104*a*, 204*a*) including a first backrest (106*a*) and a first seat base (108*a*), and a second seat (104*b*, 204*b*) on a side of the first seat, in which at least the first seat is movable between a first configuration in which the first backrest is inclined relative to the first seat base and a second configuration in which the first backrest is substantially parallel to the first seat base, and when the first seat is in the second configuration, the first backrest forms a first upper support surface.

14 Claims, 5 Drawing Sheets

(56) References Cited

U.S. PATENT DOCUMENTS

| | | |
|---|---|---|
| 7,997,531 B2 | 8/2011 | Bettell |
| 8,419,123 B2 | 4/2013 | Hankinson et al. |
| 8,720,821 B2 | 5/2014 | Ferry et al. |
| 2002/0070314 A1* | 6/2002 | Schmidt-Schaeffer ................. B60N 2/01 244/118.6 |
| 2007/0040434 A1 | 2/2007 | Plant |
| 2013/0043345 A1* | 2/2013 | Ferry .................... B60N 2/206 244/118.6 |
| 2015/0001341 A1 | 1/2015 | Ersan et al. |

FOREIGN PATENT DOCUMENTS

| | | |
|---|---|---|
| WO | 03013903 A1 | 2/2003 |
| WO | 2006054064 A1 | 5/2006 |
| WO | 2008122761 A1 | 10/2008 |

\* cited by examiner

CONVERTIBLE SEATING UNIT

This invention relates to a convertible seating unit, in particular such a seating unit suitable for, but not limited to, use in long haul flights.

In the aviation market, it is not uncommon especially on mid-range and short-range flights to use convertible seating, i.e. seats that are quickly and easily adjustable in size so that the cabin mix (ratio between different classes of service) can be modified as needed for individual flights to match the fluctuating market demand. For example, U.S. Pat. No. 4,881,702 discloses a system whereby certain seats in a row can be deactivated such that the rest of the seats in the same row can expand in width, and thus be sold as business class. These systems allow airlines to maximize profit by making efficient use of floor space.

However, long haul flights have very different market norms and passenger needs from those of mid-range and short-range flights. Business class passengers on long haul flights not only expect more space; they expect to have a "suite" with seats that can be turned into a horizontal flat bed, more privacy and direct aisle access.

There are some existing seating arrangements which partly address this requirement. For example, in one existing seating arrangement, seats with leg rests may be deployed to form a horizontal surface with the seat pan. A row of three to four such seats combine to form a bed surface long enough for a person to sleep on. However, such a design requires at least three to four seats on a row to form a bed that is long enough for a person to lie down. In addition, when the seats are in their upright configuration, they are not sufficiently differentiated from the original class of services. For example, they just look like economy class seats with empty seats next to the passenger. Such a seating arrangement therefore does not appear to be premium enough to be sold as business class.

It is thus an object of the present invention to provide a convertible seating unit in which the aforesaid shortcomings are mitigated, or at least to provide a useful alternative to the trade and public.

According to the present invention, there is provided a convertible seating unit including a first seat including a first backrest and a first seat base, and a second seat on a side of said first seat, wherein at least said first seat is movable between a first configuration in which said first backrest is inclined relative to said first seat base and a second configuration in which said first backrest is substantially parallel to said first seat base, and wherein, when said first seat is in said second configuration, said first backrest forms a first upper support surface.

Embodiments of convertible seating units according to the present invention are described below, by way of examples only, with reference to the accompanying drawings, in which.

Figure 1:
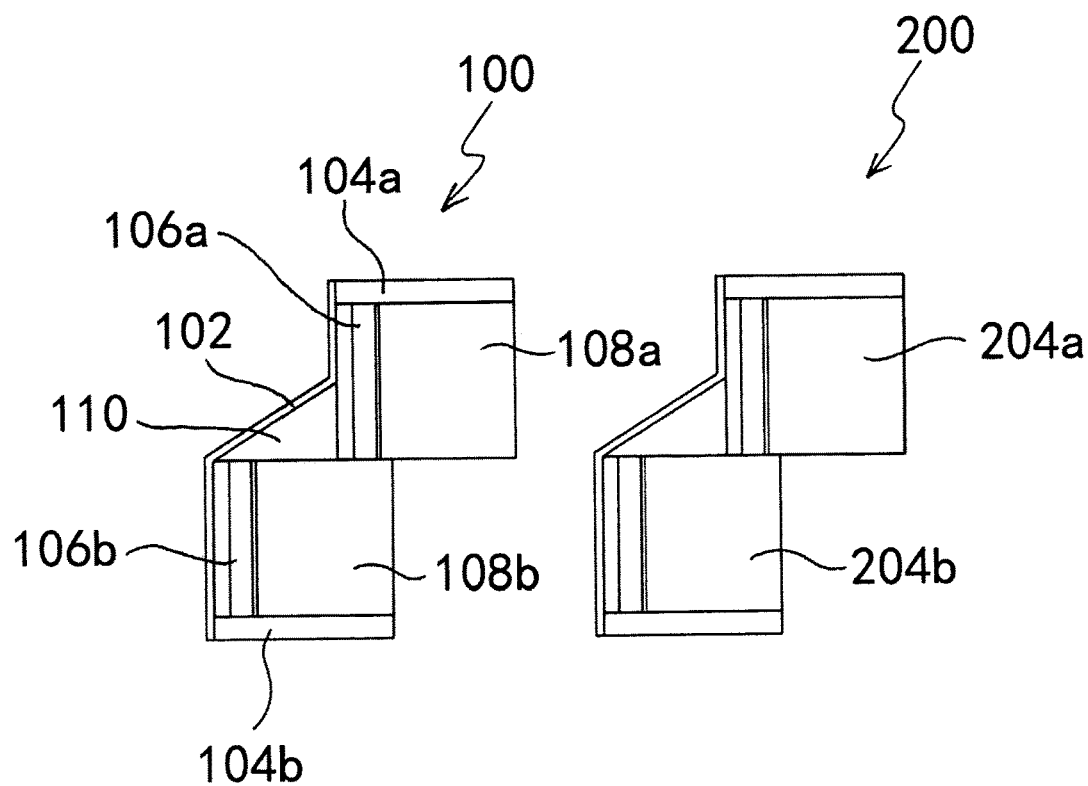
FIG. 1 is a top view of two convertible seating units according to the present invention arranged one in front of the other, with all the seats in a premium economy class upright configuration.
Figure 2:
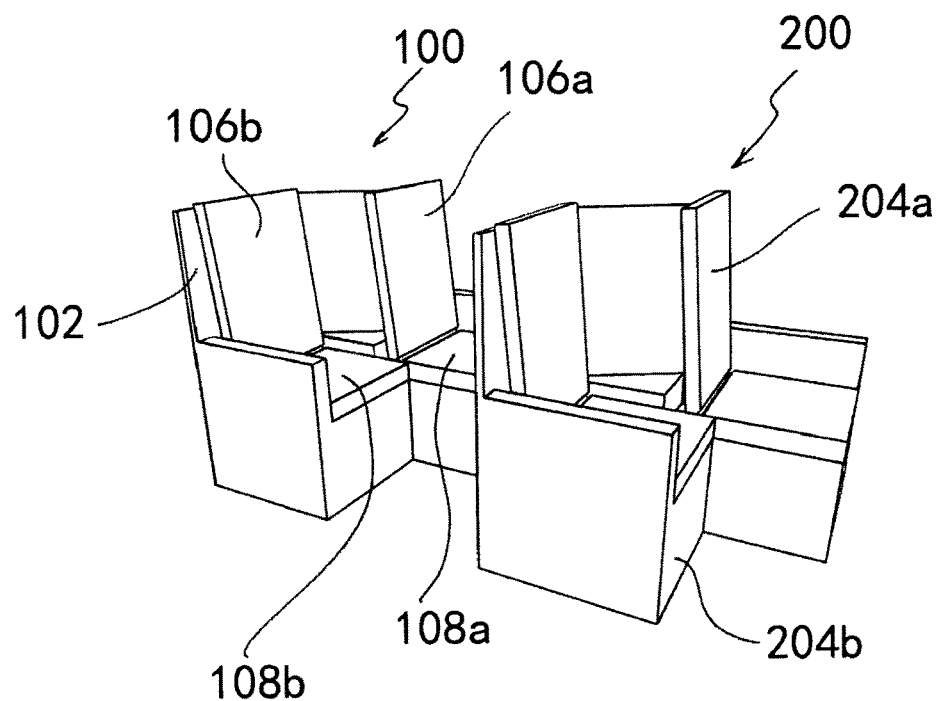
FIG. 2 is a front perspective view of the two seating units shown in FIG. 1.
Figure 3:
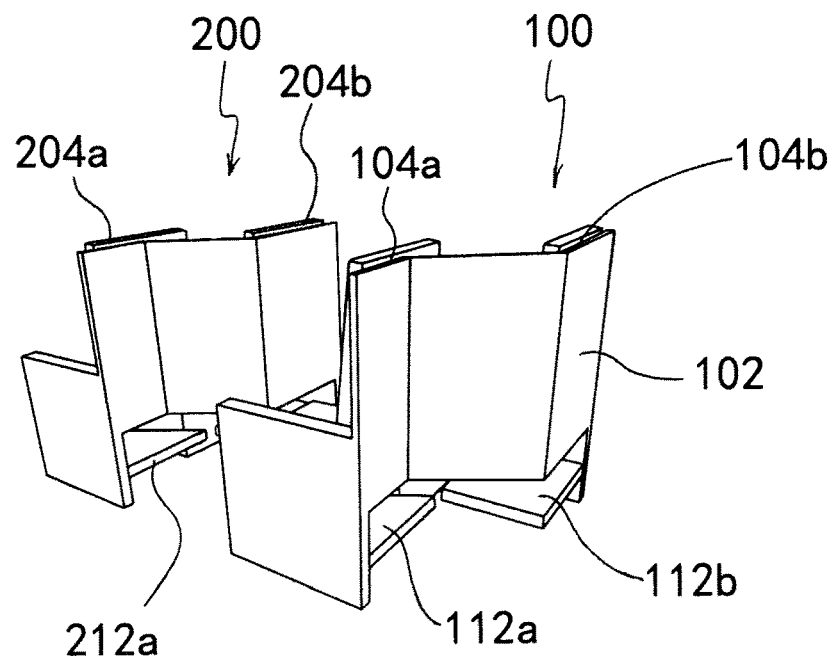
FIG. 3 is a rear perspective view of the two seating units shown in FIG. 1.

Two convertible seating units according to the present invention are shown in FIGS. 1 to 3, and generally designated as 100, 200 respectively. As both seating units 100, 200 are identically structured, only the structure and manner of operation of the seating unit 100 will be discussed in detail.

The seating unit 100 has a shell 102 surrounding the seating unit 100 from two sides and the back, defining a boundary of the seating unit 100. Within the shell 102 are two seats 104a, 104b arranged side by side with, but staggered relative to, each other. In particular, the seat 104a is positioned slightly forward relative to the seat 104b.

The seat 104a has a backrest 106a and a seat pan 108a which are pivotally connected with each other. The seat 104a is shown in FIGS. 1 to 3 in an upright configuration in which the backrest 106a is inclined relative to the seat pan 108a. In particular, the backrest 106a is generally upright relative to the seat pan 108a to allow a passenger to sit on the seat 104a. Similarly, the seat 104b has a backrest 106b and a seat pan 108b which are pivotally connected with each other. The seat 104b is shown in FIGS. 1 to 3 in an upright configuration in which the backrest 106b is inclined relative to the seat pan 108b. In particular, the backrest 106b is generally upright relative to the seat pan 108b to allow a passenger to sit on the seat 104b. There is a piece of triangular mattress 110 between the seat 104a and the seat 104b.

As shown more clearly in FIG. 3, each of the seats 104a, 104b is provided at a lower part of its back with a respective footrest 112a, 112b for a respective passenger sitting in a seat directly behind and facing the respective seat 104a, 104b. Similarly, a seat 204a of the convertible seating unit 200 directly in front of the seat 104a of the seating unit 100 is provided at a lower part of its back with a footrest 212a for a passenger sitting in the seat 104a; a seat 204b of the convertible seating unit 200 directly in front of the seat 104b of the seating unit 100 is also provided at a lower part of its back with a footrest (not shown) for a passenger sitting in the seat 104b.

When the convertible seating unit 100 is in the configuration as shown in FIGS. 1 to 3, in particular in which both the seats 104a, 104b are in their upright configuration, the convertible seating unit 100 is in a premium economy class upright configuration. When in this configuration, the seating unit 100 can accommodate two passengers. Because of the staggered positioning of the seats 104a, 104b, passengers of these two seats 104a, 104b are given more elbow width because their shoulders and elbows are offset from one another.

To convert the convertible seating unit 100 from its premium economy class upright configuration to its business class upright configuration, the backrest 106a of the seat 104a is pivoted forward (i.e. towards the seating unit 200 in front of the seating unit 100) relative to the seat pan 108a to a position in which the backrest 106a lies on the seat pan 108a and forms a planar upper support surface 114a. In this position, the backrest 106a and the seat pan 108a are parallel to each other. The footrest 212a of the seating unit 200 is then raised from its lower position (as shown in FIG. 3) to an upper position in which its upper surface 214a is co-planar with the planar upper support surface 114a formed by the backrest 106a of the seat 104a, so as to form a flush, continuous and planar upper surface, to fill up the space between the seat 104a and the seat 204a in front of it.

When the seating unit 100 is thus converted to the business class upright configuration, the seating unit 100 forms a suite for one passenger, with the passenger sitting in the seat 104b, and the upper support surface 114a and the upper surface 214a of the footrest 212a providing extra space for the passengers to put things on, or as a side couch/bench for guests to sit on and/or to have meal with the passenger.

To revert the seating unit 100 from the business class upright configuration to the premium economy class upright configuration, the backrest 106a is pivoted relative to the seat pan 108a back to the upright configuration in which the backrest 106a is inclined relative to the seat pan 108a, and the footrest 212a is moved back to its lower position at the back of the seat 204a.

Although the seating unit 100 is thus far discussed in the context in which it is convertible between the premium economy class upright configuration and the business class upright configuration by manipulating the seat 104a, as the seat 104a and the seat 104b are similarly structured, it is possible to instead manipulate the seat 104b (e.g. by pivoting the backrest 106b relative to the seat pan 108b to form a planar upper support surface and moving the footrest at the back of the seat 204b to its upper position in which its upper surface is co-planar with the planar upper support surface formed by the pivoted backrest 106b, to form a flush, continuous and planar upper surface) to convert the seating unit 100 to the business class upright configuration. This allows a passenger to choose whether the couch/bench is to be at his/her right side or left side.

Figure 4:
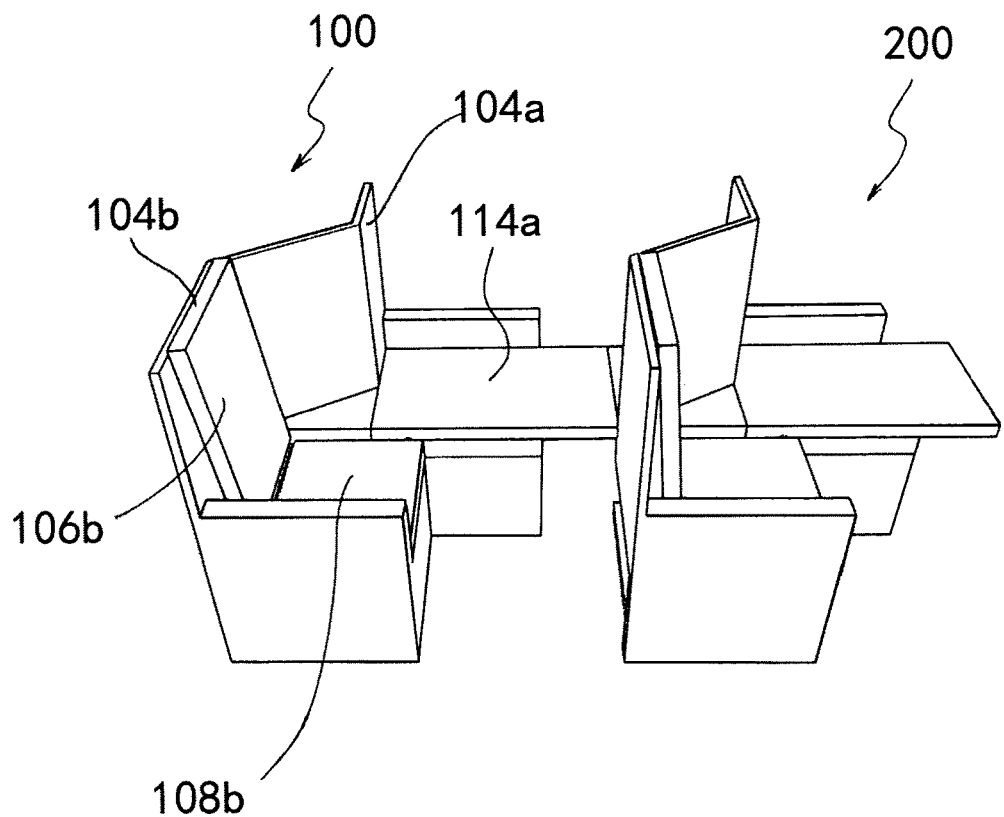
FIG. 4 is a perspective view of the two seating units shown in FIG. 1, with both seating units in a business class upright configuration.
Figure 5:
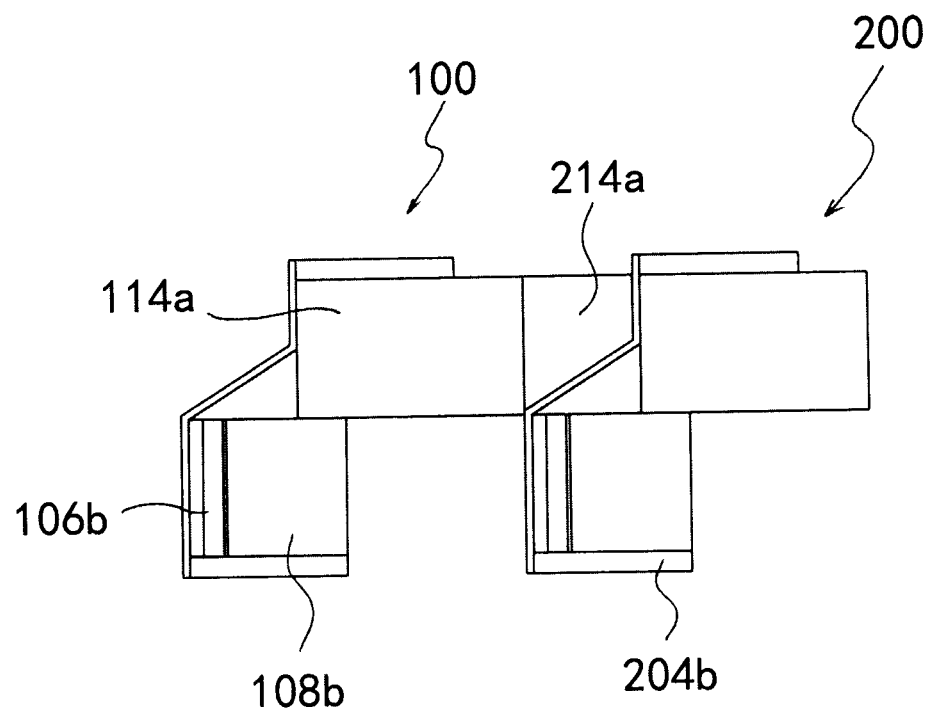
FIG. 5 is a top view of the two seating units shown in FIG. 4.
Figure 6:
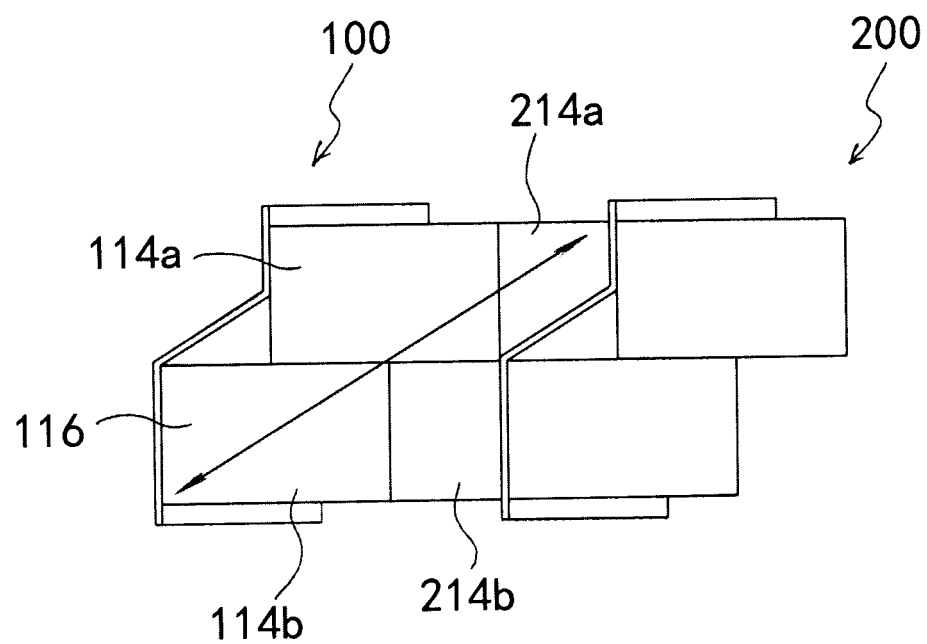
FIG. 6 is a top view of the two seating units shown in FIG. 1, with both seating units in a business class flatbed configuration.
Figure 7:
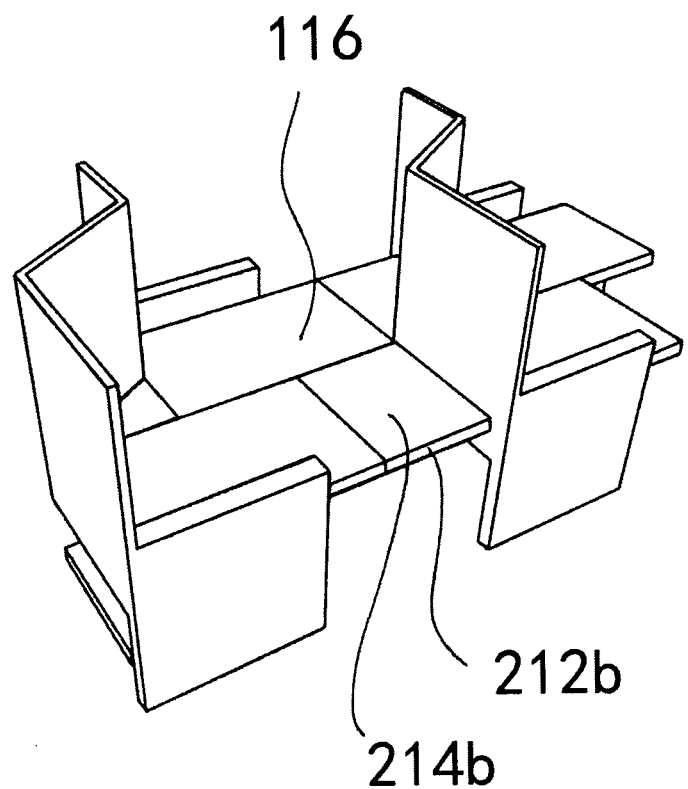
FIG. 7 is a perspective view of the two seating units shown in FIG. 6.

The seating unit 100 is further convertible between the business class upright configuration and a flatbed configuration, as shown in FIGS. 6 and 7. When the seating unit 100 is already at the business class upright configuration (as shown in FIGS. 4 and 5), the backrest 106b of the seat 104b is pivoted forward (i.e. towards the seat 204b in front of it) relative to the seat pan 108b to lie on the seat pan 108b to form a planar upper support surface 114b which is co-planar with the upper support surface 114a formed by the backrest 106a of the seat 104a. When in this position, the backrest 106b is parallel to the seat pan 108b.

A footrest 212b provided at a lower part of the back of the seat 204b of the seating unit 200 is moved from its lower position to its upper position in which its upper surface 214b is co-planar with the planar upper support surface 114b formed by the backrest 106b, to fill up the space between the seat 104b and the seat 204b in front of it.

It can be seen that when the seating unit 100 is in the flatbed configuration, the planar upper support surfaces 114a, 114b and the upper surfaces 214a, 214b of the footrests 212a, 212b are all co-planar with one another, and collectively form a flush, planar and continuous support 116 on which a passenger may lie. More particularly, since the seat 104a is positioned forward relative to the seat 104b, the support 116 is long enough diagonally, as shown by the bi-directional arrow in FIG. 6, for a passenger to lie down flat and sleep comfortably.

Figure 8:
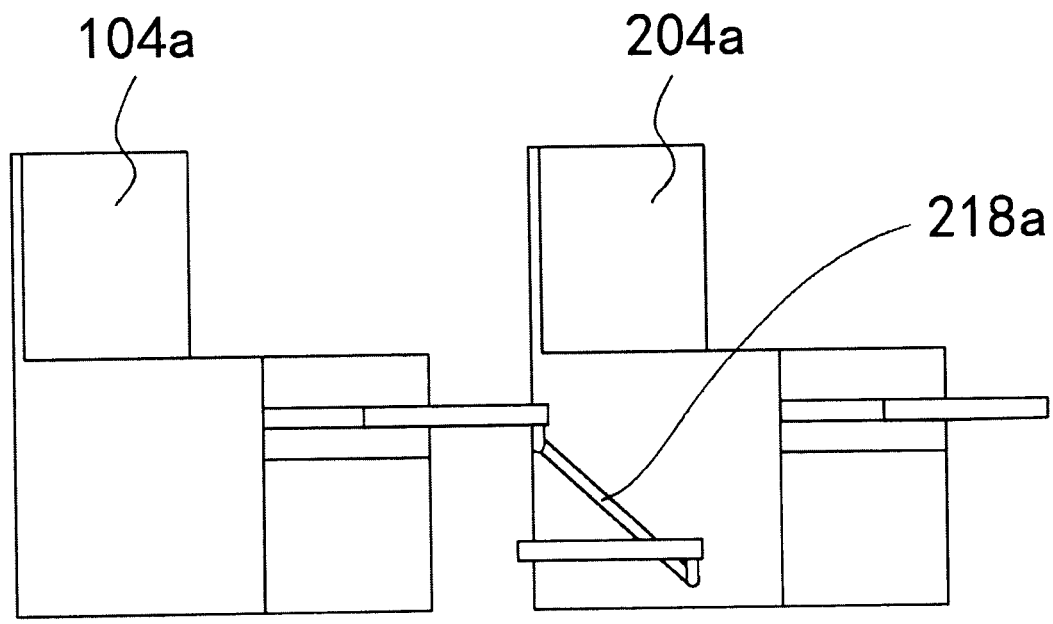
FIG. 8 is a side view showing the arrangement of a movable footrest of the convertible seating unit shown in FIG. 1.

Turning now to FIG. 8, such shows the arrangement whereby at least one of the footrests 212a, 212b is movable between its lower position and upper position. Taking the footrest 212a as an example, the footrest 212a is engaged with a rail 218a fixed relative to the seat 204a and slanted relative to a surface supporting the seating units 100, 200. The footrest 212a is thus slidable along and relative to the rail 218a between its upper position and lower position. It should be understood that for the seats 104a, 104b at the very front row, their respective footrests 212a, 212b may be installed to the floor or the wall, again movable between a lower position and an upper position.

The seating unit 100 of the present invention has thus far been discussed in the context in which the backrests 106a, 106b of the seats 104a, 104b are pivoted forward relative to and onto the respective seat pans 108a, 108b to form a respective planar upper support surface 114a, 114b. It is envisaged that the seats 104a, 104b may be manipulated in other ways to provide the necessary planar upper support surfaces.

Figures 9A, 9B, 9C:
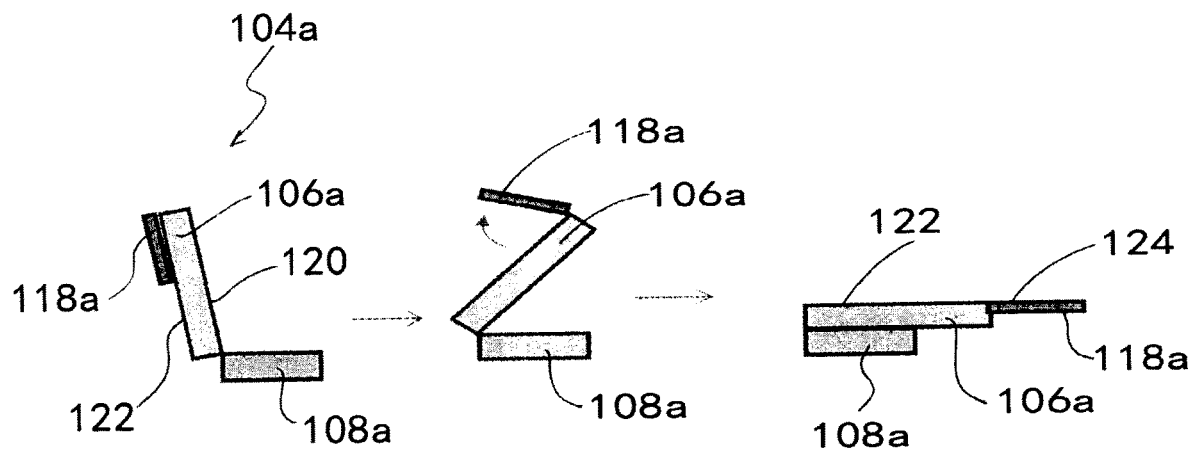
FIGS. 9A to 9C show a first method of manipulating a seat of the convertible seating unit shown in FIGS. 1.

Taking the seat 104a as an example, and as shown in FIG. 9A in which the seat 104a is in an upright configuration, the seat 104a has a backrest 106a pivotally connected at its lower end with the seat pan 108a and pivotally connected at its upper end with an extension part 118a. The backrest 106a has a front major surface 120, which, when the seat 104a is in its upright configuration, supports the back of the passenger, and a back major surface 122 which is opposite to the front major surface 120.

To convert the seating unit 100 from the premium economy class upright configuration to the business class upright configuration or to the flatbed configuration, the backrest 106a is pivoted forwardly towards the seat pan 108a, and the extension part 118a is pivoted away from the backrest 106a (as shown in FIG. 9B), until the backrest 106a lies on the seat pan 108a and an upper surface 124 of the extension part 118a is co-planar with the back major surface 122 of the backrest 106a to form an upper support surface, as shown in FIG. 9C. It can be seen that when in this configuration, the backrest 106a, the seat pan 108a and the extension member 118a are all parallel to one another.

Figures 10A, 10B, 10C:
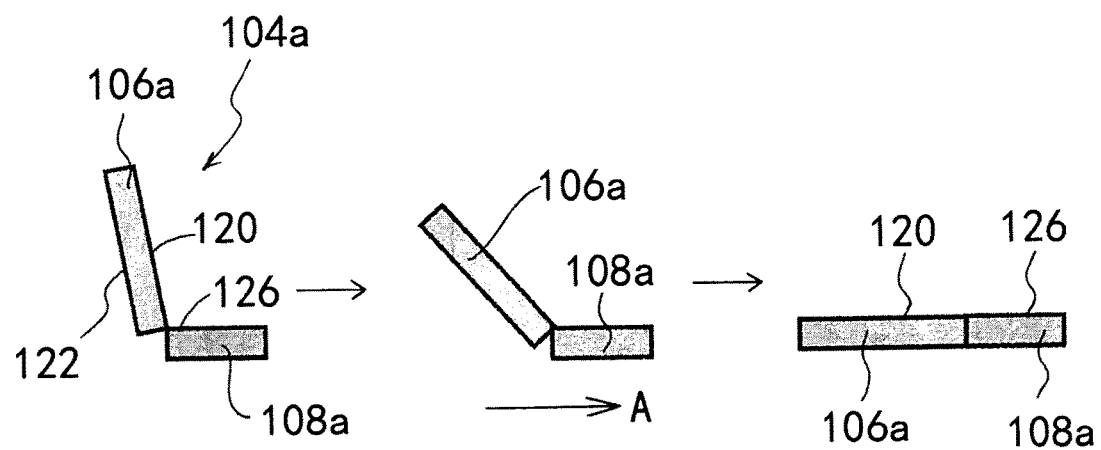
FIGS. 10A to 10C show a second method of manipulating a seat of the convertible seating unit shown in FIG. 1.

As a second way of manipulating the seat 104a, again using the seat 104a as an example, it can be seen in FIG. 10A that the backrest 106a of the seat 104a is pivotally connected with the seat pan 108a. To convert the seating unit 100 to the business class upright configuration or the flatbed configuration, the backrest 106a is pivoted away from the seat pan 108a while the seat 104 is slid forward linearly in the direction indicated by the arrow A in FIG. 10B, until the front major surface 120 of the backrest 106a is co-planar with an upper major surface 126 of the seat pan 108a to form an upper support surface, as shown in FIG. 10C. It can be seen that when in this configuration, the backrest 106a and the seat pan 108a are parallel to each other.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A convertible seating unit including:
a first seat including a first backrest and a first seat base, and
a second seat on a side of said first seat,
wherein said first seat is movable between a first configuration in which said first backrest is inclined relative to said first seat base and a second configuration in which said first backrest is substantially parallel to said first seat base, and
wherein, when said first seat is in said second configuration, said first backrest forms a first upper support surface,
wherein said second seat includes a second backrest and a second seat base,
wherein said second seat is movable between a first configuration in which said second backrest is inclined relative to said second seat base and a second configuration in which said second backrest is substantially parallel to said second seat base,
wherein, when said first seat is in its said second configuration and when said second seat is in its said second configuration, said second backrest forms a second upper support surface which is substantially co-planar with said first upper support surface, and
wherein at least said first upper support surface and said second upper support surface collectively form a flush, planar and continuous support allowing a passenger to lie on, and
wherein said first seat and said second seat are staggered relative to each other.

2. A convertible seating unit according to claim 1, wherein said first backrest has a first major surface and a second major surface which is opposite to said first major surface.

3. A convertible seating unit according to claim 2 wherein, when said first seat is in said second configuration, said first backrest lies on said first seat base.

4. A convertible seating unit according to claim 2 wherein said first backrest is pivotable relative to said first seat base and is connected with and pivotable relative to an extension member, and wherein when said first seat is in said second configuration, said extension member is pivotable relative to said first backrest to an in-use position in which an upper surface of said extension member is substantially co-planar with said first upper support surface.

5. A convertible seating unit according to claim 1, further including a first movable member which is movable between a lower position and an upper position, and wherein when said first movable member is at said upper position, an upper surface of said first movable member is substantially co-planar with said first upper support surface.

6. A convertible seating unit according to claim 5 wherein said first movable member, when at said lower position, forms a footrest for a passenger on said first seat.

7. A convertible seating unit according to claim 5 wherein said first movable member is movable between said upper position and said lower position along at least one rail.

8. A convertible seating unit according to claim 1 further including a second movable member which is movable between a lower position and an upper position, and wherein when said second seat is in its said second configuration and when said second movable member is at its said upper position, an upper surface of said second movable member is substantially co-planar with said second upper support surface.

9. A convertible seating unit according to claim 8 wherein said second movable member, when at its said lower position, forms a footrest for a passenger on said second seat.

10. A convertible seating unit according to claim 8 wherein said second movable member is movable between its said upper position and it said lower position along at least one rail.

11. A convertible seating unit according to claim 1, wherein from a top view said first seat and said second seat are staggered relative to each other in a diagonal direction wherein the passenger is allowed to lie in the diagonal direction on the flush, planar and continuous support.

12. A convertible seating unit according to claim 11, wherein the passenger is allowed to lie directly on the flush, planar and continuous support.

13. A convertible seating unit according to claim 11, wherein the flush, planar and continuous support is long enough diagonally for the passenger to lie down flat and sleep.

14. A convertible seating unit according to claim 13, wherein the passenger is allowed to lie directly on the flush, planar and continuous support.

* * * * *